United States Patent Office 2,988,473
Patented June 13, 1961

2,988,473
PETROLEUM HYDROCARBON INSECTICIDAL COMPOSITION CONTAINING ORGANO-SILICON OXIDE CONDENSATION PRODUCT
Arnold Mallis, Pittsburgh, and Albert C. Miller and Charles E. Trautman, Cheswick, Pa., assignors to Gulf Research & Development Company, Pittsburgh, Pa., a corporation of Delaware
No Drawing. Filed July 16, 1957, Ser. No. 672,113
5 Claims. (Cl. 167—27)

This invention relates to improved insecticidal compositions.

It is common practice to employ as insecticides various petroleum hydrocarbon oils alone or in combination with auxiliary chemical toxicants. The physical and chemical properties of the petroleum hydrocarbon oils will vary with the type of insecticidal composition desired. For example, in household fly sprays light petroleum fractions boiling within the kerosene range are frequently employed as carriers for auxiliary insecticide toxicants such as pyrethrins. Likewise, heavier petroleum fractions such as lubricating distillates are employed in oil sprays for a variety of insecticidal applications. Thus, petroleum oil sprays have found use in such insecticidal applications as household sprays to kill insects such as flies and cockroaches, as moth proofing compositions, for the control of mosquitoes in their larval haunts, and as livestock sprays to repel flies from cattle. In addition, petroleum oils find extensive use in agriculture as sprays to protect plants, trees and shrubs from insect pests such as scales, aphids, mites, mealy bugs and the like.

Due to the relatively low insect killing-power of petroleum oils, to obtain a satisfactory insecticidal effect, it is generally necessary to employ large quantities of the oils or alternately to employ with the oils auxiliary insecticide toxicants. Such auxiliary insecticide toxicants may consist of natural substances such as pyrethrin and rotenone extracts from plants and synthetic chemicals such as thiocyanates, allethrin, halogenated organic compounds and the like. The use of large quantities of petroleum oils is prohibitive in certain insecticidal applications because of the adverse effect which the oils have on plants. It is known that petroleum oils in large quantities exhibit a toxic effect on plant life frequently resulting in serious injury to the plants and material reduction of the crop. It is extremely desirable therefore, to substantially increase the insecticidal activity of petroleum oils so as to obtain a desired toxic effect against insects, while employing the oils in sufficiently low quantities to avoid injury to plant life. Similarly, in those insecticidal compositions comprising a petroleum oil together with auxiliary toxic ingredients, an increase in the insecticidal activity of the petroleum oil is advantageous economically in that it permits a reduction in the amount of costly auxiliary toxicants required in the composition.

We have now found that the effectiveness of insecticidal compositions containing a hydrocarbon oil either alone or in combination with auxiliary insecticide toxicants can be substantially increased by the incorporation therein of a small quantity sufficient to increase the insecticidal activity of the hydrocarbon oil, of a liquid condensation product of an organo-silicon oxide compound.

The liquid organo-silicon oxide condensation products found suitable for the purposes of our invention are composed primarily of a plurality of silicon atoms linked together through oxygen atoms, each silicon atom having attached to it at least one organic radical either directly or through an oxygen atom and may contain one or more other substituents such as hydroxyl groups or halides. Typical organo-silicon oxide condensation products found useful for the purposes of our invention include for example, the liquid organo-siloxane polymers and the liquid organo-silicate condensation products.

The liquid organo-siloxanes commonly known as silicones, are polymers composed of multiples of the structure:

wherein R and R' are similar or dissimilar organic radicals such as alkyl, aryl, aralkyl, alkaryl or heterocyclic groups or substituted derivatives thereof. Thus R and R' can be an organic group such as methyl, ethyl, normal propyl, isopropyl, butyl, isobutyl, amyl, heptyl, phenyl, benzyl, tolyl, naphthyl and the like. They are usually produced as condensation or polymerization products of the organo-silicols including the mono-silicols, di-silicols and tri-silicols and mixtures of these silicols. The condensation products obtainable may be straight chain, cyclic or cross polymerization products. The cyclic and chain blocked linear polymers of moderate molecular weight are liquids, while the linear polymers of very high molecular weight and the cross-linked polymers are usually solids. The liquid organo-siloxanes are employed in the compositions of this invention. Typical of the organo-siloxanes or silicones which have been found to materially enhance the insecticidal activity of the petroleum oils is the linear methyl poly-siloxane compound, dimethyl silicone, having the general formula:

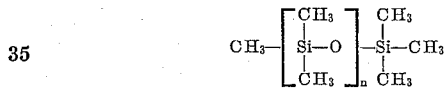

wherein $n$ is one or more.

Such compounds are available commercially in a considerable number of viscosity grades. For the purposes of this invention those having viscosities from about 0.65 to 1,000,000 centistokes at 25° C., can be employed with those having viscosities in the range 1,000 to 100,000 centistokes being preferred.

The liquid organo-silicate condensation products which have been found to enhance the insecticidal activity of hydrocarbon oils are represented by the probable formula:

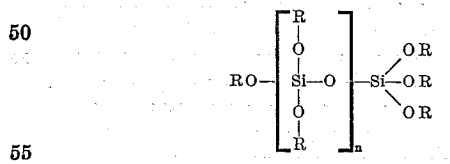

in which R represents an organic radical such as an alkyl, aryl, aralkyl, alkaryl or a heterocyclic group of the type described above for the organo-siloxane compounds and $n$ may be one or higher depending upon the number of organo-silicate residues in the complex molecule of the condensation product. These compounds may be obtained as the polymerized hydrolysis products of the esters of ortho silicic acid by controlled hydrolysis of the tetra orthosilicate esters with water. Hydrolysis and condensation or polymerization take place simultaneously with the formation of liquid products. Separation of the desired fractions may be accomplished by vacuum distillation of the total reaction products.

The liquid organo-silicon oxide condensation products are incorporated in the hydrocarbon oils in an amount sufficient to substantially increase the insecticidal activity of the oils. These organo-silicon oxide condensation products have proved effective for this purpose when employed in amounts as low as 0.001% by weight of oil. In general, we have found a substantial increase in the insecticidal activity of hydrocarbon oils when the organo-silicon oxide condensation products are employed in amounts ranging from 0.001% to 2% by weight of the composition. The addition of organo-silicon oxide condensation products does not deleteriously modify the other desirable properties of the oils. For the purposes of our invention it is immaterial that the organo-silicon oxide condensation products in the amounts in which they are employed cause a decrease in the foaming of the heavy oils and an increase in the foaming of the light oils.

The organo-silicon oxide condensation products in accordance with our invention may be advantageously utilized to increase the insecticidal activity of those hydrocarbon oils which are generally employed in the art in insecticidal compositions. The hydrocarbon oils which are so generally employed in the art in insecticidal compositions are petroleum hydrocarbon oils having in general, distillation ranges from about 300 to 800° F. To illustrate, household sprays can be prepared utilizing kerosene having a distillation range from about 350 to 500° F. and a flash point of at least 130° F. Optionally, in lieu of the kerosene, a deodorized petroleum fraction having a distillation range of from about 366 to 490° F. and a flash point of 154° F. can be used. In other oil sprays, for example livestock sprays and agricultural sprays, heavier petroleum fractions such as lubricating oil distillates having distillation ranges of from 520 to 690° F. and a viscosity of 43.2 SUS at 100° F. can be satisfactorily employed. Likewise the organo-silicon oxide condensation products can be advantageously employed to enhance the insecticidal activity of petroleum hydrocarbon oils which are employed as insecticides in the form of oil-water emulsions. Such emulsions are prepared simply by adding to the required amount of water, a minor amount generally from about 1 to 5% by weight of the hydrocarbon oil and vigorously agitating the mixture. Various emulsifying agents known in the art can be employed to assist in emulsification of the mixture.

As stated previously, the organo-silicon oxide condensation products according to our invention can be utilized in insecticidal compositions which contain in addition to a hydrocarbon oil, various natural or synthetic insecticide toxicants, that is, chemical ingredients which exhibit toxic properties against insects. A large number of such toxicants are known and commonly employed in the art together with petroleum fractions in the preparation of effective insecticidal compositions. As representative of these toxicants may be mentioned plant derivatives such as pyrethrin extract, derris extract, rotenone; synthetic chemicals such as thiocyanates, xanthates, allethrin, halogen containing insecticides such as DDT, 2,2-bis(parachlorophenyl) 1,1,1-trichloroethane, methoxychlor, 2,2-bis(paramethoxyphenyl)-1,1,1-trichloroethane, pentachlorophenol ($C_6Cl_5OH$), lindane (gamma isomer of benzene hexachloride, i.e., $C_6H_6Cl_6$), Perthane (diethyl diphenyl dichloro ethane), chlordane (1,2,4,5,6,7,8,8-octachloro-4,7-methano-3a,4,7,7a-tetrahydroindan), dieldrin (1,2,3,4,10,10-hexachloro-6,7-epoxy-1,4,4a,5,6,7,8,8a-octahydro-1,4,5,8-dimethanonaphthalene), parathion (O,O-diethyl O-p-nitrophenyl thiophosphate) and the like.

The following examples illustrate the effectiveness of the organo-silicon oxide condensation products in enhancing the insecticidal activity of various petroleum hydrocarbon oils. These examples are intended to illustrate the invention which is not to be constructed as limited thereby.

*Example I*

A number of insecticidal compositions were prepared and tested against houseflies utilizing a liquid organo-silicon oxide condensation product (dimethyl silicone) available from Dow Corning Corporation as Fluid 200. The petroleum fraction utilized is representative of the light hydrocarbon oils distilling within the kerosene range which are generally used in household insecticidal sprays and had an initial boiling point of 376° F., a 50% point of 416° F., an end point of 492° F., a flash point of 152° F. and an API gravity of 51.2. The test employed was the Barnhart tower test, or as it is commonly known, the mist tower method for testing insecticides. The Barnhart spray tower utilized in the test is adapted for the controlled application of a settling mist and consists of a vertical spray tower of two concentric celluloid cylinders. The dosage of spray is delivered by means of a De Vilbiss artist's air brush as a fine mist. A slide permits the larger droplets to settle for a desired time to form a standard mist. The slide is then moved and the flies which are confined in paper dishes covered with wire screen, are exposed for a time to the standard mist. Sugar water solution is applied to the treated cage and the percent dead is determined 24 hours after treatment. This apparatus is described in detail in the 1941 issue of Soap and Sanitary Chemicals, vol. #7, pp. 105–115. When the insects were subjected to a 4 milliliter spray dosage, a settling time of 15 seconds and an exposure time of 210 seconds, the following results were obtained:

| Spray No. | Mg./100 ml. Oil (Specific gravity 0.78) | Percent Dead |
|---|---|---|
| 1 | 100 mg. dimethyl silicone | 41.0 |
| 2 | 200 mg. dimethyl silicone | 49.3 |
| 3 | 500 mg. dimethyl silicone | 53.2 |
| 4 | 1,000 mg. dimethyl silicone | 59.8 |
| 5 | Oil Alone | 23.8 |

*Example II*

Utilizing the same liquid organo-silicon oxide condensation product and petroleum fraction as in Example I, a number of insecticidal compositions were prepared containing pyrethrins as an auxiliary insecticide toxicant. The same test method as that described in Example I was employed using a 2 milliliter spray dosage, a settling time of 15 seconds and an exposure time of 70 seconds. The following results were obtained against houseflies:

| Spray No. | Mg./100 ml. Oil (Specific gravity 0.78) | Percent Dead |
|---|---|---|
| 1 | 50 mg. pyrethrins | 49.9 |
| 2 | 1,000 mg. dimethyl silicone | 19.6 |
| 3 | 50 mg. pyr.+50 mg. dimethyl silicone | 52.0 |
| 4 | 50 mg. pyr.+100 mg. dimethyl silicone | 60.6 |
| 5 | 50 mg. pyr.+500 mg. dimethyl silicone | 69.9 |
| 6 | 50 mg. pyr.+1,000 mg. dimethyl silicone | 68.7 |
| 7 | Oil Alone | 1.7 |
| 8 | Untreated | 1.7 |

*Example III*

Utilizing the same liquid organo-siloxane (dimethyl silicone) and petroleum fraction as in Example I, a number of killing tests were conducted on American and Oriental cockroaches. The test method employed is that which is described by Albert C. Miller et al. in the Journal of Economic Entomology, volume 47, pages 23–26, February 1954, and which is referred to as the Gulf Race Track method of testing. Utilizing varying spray dosages the results obtained were as follows:

| Spray No. | Mg./100 ml. Oil (Specific gravity 0.78) | Cockroach Species | Dosage, ml. | 30' Knock Down | 48 Hrs. Dead and Moribund |
|---|---|---|---|---|---|
| 1 | 1,000 mg. dimethyl silicone | American | 48 | 51 | 98 |
| 2 | Oil Alone | do | 48 | 31 | 79 |
| 3 | 1,000 mg. dimethyl silicone | Oriental | 48 | 46 | 95 |
| 4 | Oil Alone | do | 48 | 23 | 46 |
| 5 | 1,000 mg. dimethyl silicone | American | 42 | 46 | 99 |
| 6 | Oil Alone | do | 42 | 39 | 83 |
| 7 | 1,000 mg. dimethyl silicone | Oriental | 42 | 40 | 91 |
| 8 | Oil Alone | do | 42 | 28 | 65 |
| 9 | 1,000 mg. dimethyl silicone | American | 36 | 39 | 95 |
| 10 | Oil Alone | do | 36 | 33 | 74 |
| 11 | 1,000 mg. dimethyl silicone | Oriental | 36 | 28 | 98 |
| 12 | Oil Alone | do | 36 | 14 | 53 |

Example IV

A comparison of the insecticidal activity of a petroleum hydrocarbon oil alone and the same oil containing an organo-silicon oxide condensation product is shown against German cockroaches. The petroleum fraction employed is representative of the heavier petroleum fractions commonly employed in livestock and agricultural sprays and had an initial boiling point of 528° F., a 50% point of 582° F. and a 95% point of 684° F., a P-M flash point of 290° F., an API gravity of 39.2°, and a specific gravity of 0.82. The silicon oxide condensation product employed is methyl phenyl silicone available from Dow Corning as Fluid 510. The test method employed is the Official Cockroach spray method adopted by the Chemical Specialties Manufacturers Association, Inc., at the 39th Mid-Year Meeting, May 1953. The spray chamber utilized in the test consists of a box-like structure of solid material, the floor of which is covered with mesh wire cloth. Suitable guides are fastened to the chamber floor to permit the centering of the treatment container directly beneath the nozzle of a spray gun. The treatment container is a screen bottomed container 3½ inches in diameter with 3 inch side walls, the inner wall surfaces of which are oiled or greased to prevent the escape of the roaches and to confine them to the container floor. The spray dosage is delivered by means of a De Vilbiss atomizer mounted in the spray chamber in vertical position and centered with the nozzle tip 28 inches above the bottom of the treatment container which rests on the spray chamber floor. The spraying of individual test groups is effected by bringing an accurately measured amount of the test spray contained in a vial in contact with the atomizer intake tube. The treatment container is removed from the spray chamber 30 seconds after the start of the spray application and the test insects are transferred from the treatment container to the recovery dish. The treated roaches are then held under rearing room conditions throughout a 48 hour observation period and receive neither food nor water. Roaches held under observation more than 48 hours are supplied with food and water after 48 hours. This test method is described in detail in the Proceedings of the 39th Mid-Year Meeting of the Chemical Specialties Manufacturers Association, Inc., pages 110–112, May 1953. The average results for 10 replicates of 20 German cockroaches each are as follows:

| Test Spray | Dosage (ml.) | Percent Dead and Moribund | |
|---|---|---|---|
| | | 24 Hrs. | 48 Hrs. |
| Oil Alone | 0.2 | 2 | 14 |
| 1,000 mg. methyl phenyl silicone per 100 ml. oil | 0.2 | 15 | 81 |
| Untreated | | 1 | 2 |

Example V

A number of insecticidal compositions were prepared by incorporating varying amounts of a liquid organo-silicon oxide condensation product (dimethyl silicone, Dow Corning Fluid 200) in a petroleum hydrocarbon oil having an API gravity of 28.5, a flash point of 325° F., a viscosity of 103 SUS at 100° F. The resulting compositions were tested as insecticides against German male cockroaches. The same test method as in Example IV was employed and a 0.4 milliliter spray dosage applied. The results shown below are the average results of 5 replicates of 20 cockroaches each.

| Test Spray | Percent Dead and Moribund, 72 Hrs. |
|---|---|
| Oil Alone | 55.0 |
| Oil+0.001% dimethyl silicone | 65.0 |
| Oil+0.01% dimethyl silicone | 74.0 |
| Untreated | 2.0 |

The results of another series of tests are as follows:

| Test Spray | Percent Dead and Moribund, 72 Hrs. |
|---|---|
| Oil Alone | 63.0 |
| Oil+0.01% dimethyl silicone | 95.0 |
| Oil+0.1% dimethyl silicone | 100.0 |
| Untreated | 5.0 |

Example VI

In this example tetra ethyl-o-silicate condensation products are prepared by partial hydrolysis of tetra ethyl-o-silicate. The preparation of the tetra ethyl-o-silicate condensation products were as follows: Freshly distilled tetra ethyl-o-silicate was mixed with alcohol containing about 4.5% of water in such proportion as to provide about 0.8 mol of water per mol of silicate. The mixture was then heated at refluxing temperature for two hours. The alcohol and unchanged tetra ethyl orthosilicate were then distilled off at atmospheric pressure. The condensation products were then fractionally distilled and the product boiling above 287° C./3.8 mm. was added to the same petroleum fraction as in Example IV to form an insecticidal composition in accordance with this invention. This fraction of the condensation product had the following inspection:

Percent
Carbon _____ 29.66
Hydrogen _____ 6.22
Silicon _____ 24.41

This novel composition was tested as an insecticide against German male cockroaches utilizing the same test method as in Example IV. The average results for 5 replicates of 20 cockroaches each are as follows:

| Test Spray | Dosage (ml.) | Percent Dead and Moribund | |
|---|---|---|---|
| | | 48 Hrs. | 72 Hrs. |
| Oil Alone | 1 | 27 | 30 |
| Oil+.001 mg. ethyl silicate condensation product per 100 ml. oil | 1 | 75 | 80 |
| Untreated | 1 | 8 | 10 |

*Example VII*

In this example a quick breaking emulsion was prepared by the addition of 2.5% by volume of the same petroleum oil as in Example IV, to distilled water, using a small quantity (0.25%) of a commercial emulsifier, (Triton X–100) to effect emulsification. A second emulsion was prepared in the same manner utilizing the same oil to which there was added a small amount of dimethyl silicone (Dow Corning Fluid 200). Both emulsions were utilized to spray twigs of the euonymus vine infested with euonymus scale (*Unaspis euonymi*). A comparison of the effectiveness of both sprays is seen in the following table:

| Test Spray | Percent Dead 5 Days After Spraying |
|---|---|
| Oil Emulsion | 43.0 |
| Oil Emulsion+0.001% dimethyl silicone | 71.0 |
| Untreated | 15.0 |

As seen from all the foregoing examples, the incorporation of small amounts of liquid organo-silicon oxide condensation products in various hydrocarbon oils substantially increases the insecticidal activity of the oils. Furthermore, as shown particularly in Example V, enhancement of the mortality action of the hydrocarbon oils is achieved when the organo-silicon oxide condensation products are utilized in exceptionally small amounts.

The economic advantages of the invention are readily apparent in that the invention provides highly effective relatively low-cost insecticides utilizing as the active toxicant simply a petroleum hydrocarbon fraction. Similarly, the invention is economically advantageous in that small amounts of organo-silicon oxide condensation products can be incorporated in petroleum hydrocarbon oil containing insecticides to materially reduce the required amount of more costly auxiliary insecticide toxicants. Furthermore, due to the increased insecticidal efficiency achieved in accordance with the invention, petroleum hydrocarbon oils in small quantities can be successfully utilized as insecticides. This feature of the invention is particularly advantageous in that it permits a more widespread use of petroleum hydrocarbon oils as plant sprays.

The expression "consisting essentially of" as used in the claims means that the insecticidal composition is made up of the components recited and these components are the characterizing ones. But, the expression does not exclude the presence of minor amounts of materials which do not materially affect the basic and novel characteristics of the composition.

Resort may be had to the various modifications and variations of the invention which fall within the spirit of the invention and scope of the appended claims.

1. An insecticidal composition consisting essentially of a petroleum hydrocarbon oil having insecticidal properties and boiling in the range from about 300° to 800° F. and from about 0.001 to 2 percent by weight of a liquid organo-silicon oxide condensation product having the formula:

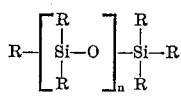

wherein R is selected from the group consisting of lower alkyl and aryl radicals and $n$ is an integer.

2. An insecticidal composition consisting essentially of a petroleum hydrocarbon oil having insecticidal properties and boiling in the range from about 300° to 800° F. and from about 0.001 to 2 percent by weight of a liquid organo-silicon oxide condensation product having the formula:

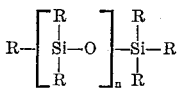

wherein R is a methyl radical and $n$ is an integer.

3. An insecticidal composition consisting essentially of a petroleum hydrocarbon oil having insecticidal properties and boiling in the range from about 300° to 800° F. and from about 0.001 to 2 percent by weight of a liquid organo-silicon oxide condensation product having the formula:

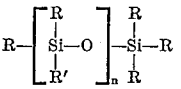

wherein R is a methyl radical and R' is a phenyl radical and $n$ is an integer.

4. An insecticidal composition consisting essentially of a petroleum hydrocarbon oil having insecticidal properties and boiling in the range from about 300° to 800° F. and from about 0.001 to 2 percent by weight of a liquid organo-silicate condensation product having the formula:

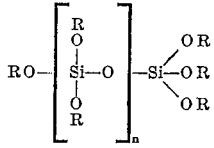

wherein R is a lower alkyl radical and $n$ is an integer.

5. An insecticidal composition consisting essentially of a petroleum hydrocarbon oil having insecticidal properties and boiling in the range from about 300° to 800° F. and from about 0.001 to 2 percent by weight of a liquid organo-silicate condensation product having the formula:

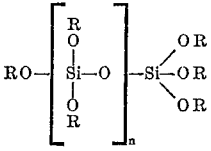

wherein R is an ethyl radical and $n$ is an integer.

References Cited in the file of this patent

UNITED STATES PATENTS

| | | |
|---|---|---|
| Re. 23,080 | Eck | Jan. 25, 1949 |
| 2,575,098 | Crawford | Nov. 13, 1951 |
| 2,582,568 | Speier | Jan. 15, 1952 |
| 2,611,776 | Speier | Sept. 23, 1952 |
| 2,681,878 | Kauppi | June 22, 1954 |
| 2,728,785 | Albisseti | Dec. 27, 1955 |

OTHER REFERENCES

Frear: Chemistry of Insecticides, Fungicides and Herbicides, 2nd ed., D. Van Nostrand, 1948, pp. 189–195.

Shepard: The Chemistry and Action of Insecticides (1951), pp. 191–202.